United States Patent
Kim et al.

(10) Patent No.: US 10,473,899 B2
(45) Date of Patent: *Nov. 12, 2019

(54) OPTICAL IMAGING SYSTEM

(71) Applicant: SAMSUNG ELECTRO-MECHANICS CO., LTD., Suwon-si (KR)

(72) Inventors: Hyuk Joo Kim, Suwon-si (KR); Seong Ho Hwang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/041,094

(22) Filed: Jul. 20, 2018

(65) Prior Publication Data
US 2018/0348482 A1    Dec. 6, 2018

Related U.S. Application Data

(63) Continuation of application No. 15/363,989, filed on Nov. 29, 2016, now Pat. No. 10,054,771.

(30) Foreign Application Priority Data

Apr. 6, 2016    (KR) .................... 10-2016-0042247

(51) Int. Cl.
*G02B 9/00*    (2006.01)
*G02B 15/14*    (2006.01)
(Continued)

(52) U.S. Cl.
CPC ............ *G02B 13/005* (2013.01); *B60R 11/04* (2013.01); *G02B 5/005* (2013.01); *G02B 9/64* (2013.01);
(Continued)

(58) Field of Classification Search
CPC .......... G02B 9/64; G02B 9/62; G02B 13/004; G02B 13/24; G02B 13/00; G02B 9/34; G02B 13/04
(Continued)

(56) References Cited

U.S. PATENT DOCUMENTS 5,331,465 A    7/1994    Miyano
8,953,093 B2   2/2015    Katou et al.
(Continued)

FOREIGN PATENT DOCUMENTS

CN    202916487 U    5/2013
CN    103576297 A    2/2014
(Continued)

OTHER PUBLICATIONS

Chinese Office Action dated Jun. 21, 2017 in corresponding Chinese Model Application No. 201621454567.7 (4 pages with English translation).
(Continued)

*Primary Examiner* — Dawayne Pinkney
(74) *Attorney, Agent, or Firm* — NSIP Law

(57) ABSTRACT

An optical imaging system includes a first lens having refractive power; a second lens having refractive power; a third lens having refractive power and cemented to the second lens; a fourth lens having refractive power; a fifth lens having refractive power and cemented to the fourth lens; a sixth lens having refractive power; a seventh lens having refractive power; and an eighth lens having refractive power. The first to eighth lenses are sequentially disposed in numerical order beginning with the first lens from an object side of the optical imaging system toward an imaging plane of the optical imaging system.

20 Claims, 3 Drawing Sheets

(51) Int. Cl.
  *G02B 13/04* (2006.01)
  *G02B 9/62* (2006.01)
  *G02B 13/00* (2006.01)
  *B60R 11/04* (2006.01)
  *G02B 5/00* (2006.01)
  *G02B 9/64* (2006.01)
  *G02B 27/00* (2006.01)
  *H04N 5/225* (2006.01)
  *H04N 7/18* (2006.01)

(52) U.S. Cl.
  CPC ........... *G02B 13/006* (2013.01); *G02B 13/04* (2013.01); *G02B 27/0025* (2013.01); *H04N 5/2254* (2013.01); *H04N 7/183* (2013.01); *B60R 2300/8093* (2013.01)

(58) Field of Classification Search
  USPC ................. 359/754, 656, 681, 750, 761–762
  See application file for complete search history.

(56) References Cited

U.S. PATENT DOCUMENTS

| | | |
|---|---|---|
| 2010/0231781 A1 | 9/2010 | Lee |
| 2013/0271851 A1 | 10/2013 | Souma |
| 2014/0198392 A1 | 7/2014 | Han |
| 2014/0307329 A1 | 10/2014 | Katakura |
| 2015/0042773 A1 | 2/2015 | Uzawa et al. |
| 2016/0070116 A1 | 3/2016 | Yoneyama |
| 2017/0192200 A1 | 7/2017 | Hsieh et al. |
| 2017/0293110 A1 | 10/2017 | Kim et al. |

FOREIGN PATENT DOCUMENTS

| | | |
|---|---|---|
| CN | 103852872 A | 6/2014 |
| CN | 103926681 A | 7/2014 |
| CN | 203909384 U | 10/2014 |
| CN | 204009204 U | 12/2014 |
| CN | 105334605 A | 2/2016 |
| CN | 105403983 A | 3/2016 |
| CN | 207424358 U | 5/2018 |
| JP | 2011-170371 A | 9/2011 |
| JP | 2013-235239 A | 11/2013 |
| JP | 2016-001335 A | 1/2016 |
| KR | 10-2010-0103292 A | 9/2010 |

OTHER PUBLICATIONS

Chinese Office Action dated Nov. 27, 2017 in counterpart Chinese Patent Application No. 201621454567.7 (2 pages in English; 2 pages in Chinese).

Chinese Office Action dated Jan. 25, 2019 in corresponding Chinese Patent Application No. 201611224458.0. (11 pages in English, 9 pages in Chinese).

Chinese Office Action dated Jul. 10, 2019 in corresponding Chinese Patent Application No. 201611224458.0 (9 pages in English, 6 pages in Chinese).

| EXAMPLE ||||||
| --- | --- | --- | --- | --- | --- |
| F No. = | 1.60 | | FOV = | 75.00 | |
| SURFACE NUMBER | | RADIUS OF CURVATURE | THICKNESS /DISTANCE | INDEX OF REFRACTION | ABBE NUMBER | FOCAL LENGTH |
| S0 | | infinity | | | | |
| S1 | FIRST LENS | 25.9890 | 1.2000 | 1.620 | 58.1 | -12.825 |
| S2 | | 5.9810 | 5.3040 | | | |
| S3 | SECOND LENS | 10.3070 | 1.0770 | 1.710 | 84.2 | -48.266 |
| S4 | | 7.5800 | 0.0000 | | | |
| S5 | THIRD LENS | 7.5800 | 2.1100 | 1.940 | 19.0 | 23.980 |
| S6 | | 9.8800 | 1.2160 | | | |
| S7 | STOP | infinity | 1.5850 | | | |
| S8 | FOURTH LENS | -5200.0590 | 6.1290 | 1.700 | 58.6 | 8.742 |
| S9 | | -6.1150 | 0.0000 | | | |
| S10 | FIFTH LENS | -6.1150 | 1.1560 | 1.920 | 19.7 | -4.098 |
| S11 | | 10.7240 | 0.2000 | | | |
| S12 | SIXTH LENS | 19.4880 | 3.7300 | 1.700 | 55.5 | 23.050 |
| S13 | | -86.3950 | 0.0940 | | | |
| S14 | SEVENTH LENS | -14.9740 | 3.6800 | 1.920 | 20.9 | -5.855 |
| S15 | | 9.4030 | 1.6370 | | | |
| S16 | EIGHTH LENS | 15.9060 | 4.0880 | 1.700 | 55.5 | 25.889 |
| S17 | | 116.3100 | 3.8270 | | | |
| S18 | FILTER | infinity | 2.0000 | 1.520 | 64.2 | |
| S19 | | infinity | 0.8260 | | | |
| IMAGING PLANE | IMAGING PLANE | infinity | | | | |

FIG. 2

OPTICAL IMAGING SYSTEM

CROSS-REFERENCE TO RELATED APPLICATIONS

This application is a continuation of U.S. patent application Ser. No. 15/363,989 filed on Nov. 29, 2016, now U.S. Pat. No. 10,054,771 issued on Aug. 21, 2018, which claims the benefit under 35 USC 119(a) of Korean Patent Application No. 10-2016-0042247, filed on Apr. 6, 2016, in the Korean Intellectual Property Office, the entire disclosures of which are incorporated herein by reference for all purposes.

BACKGROUND

1. Field

The following description relates to an optical imaging system mounted in a monitoring camera.

2. Description of Related Art

A small monitoring camera is commonly mounted in a vehicle to image a front visual field and a rear visual field of the vehicle. For example, a small monitoring camera may be mounted on a rearview mirror of the vehicle to image moving vehicles, pedestrians, and other objects in front of the vehicle. Such a small monitoring camera may not simply image objects in front of and behind the vehicle, but may also be used as a sensor to recognize the objects in front of and behind the vehicle.

In this regard, a monitoring camera used as a sensor requires a high resolution to be able to sense fine movements. The resolution of a monitoring camera used as a sensor can be increased using a bright optical system. However, an excessively bright optical system can cause the internal temperature of a monitoring camera to increase, thereby decreasing the resolution thereof.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system may include a first lens having refractive power; a second lens having refractive power; a third lens having refractive power and cemented to the second lens; a fourth lens having refractive power; a fifth lens having refractive power and cemented to the fourth lens; a sixth lens having refractive power; a seventh lens having refractive power; and an eighth lens having refractive power; and the first to eighth lenses are sequentially disposed in numerical order beginning with the first lens from an object side of the optical imaging system toward an imaging plane of the optical imaging system.

The first lens may have negative refractive power.
The second lens may have negative refractive power.
The third lens may have positive refractive power.
The fourth lens may have positive refractive power.
The fifth lens may have negative refractive power.
The sixth lens may have positive refractive power.
The seventh lens may have negative refractive power.
The eighth lens may have positive refractive power.

The optical imaging system may further include a stop disposed between two of the lenses; an overall refractive power of ones of the lenses disposed between the object side of the optical imaging system and the stop may be negative; and an overall refractive power of ones of the lenses disposed between the stop and the imaging plane of the optical imaging system may be positive.

The optical imaging system may satisfy the Conditional Expressions $f2<f1<0$, $f1<f5<0$, $f7<f5<0$, $0<f4<f3$, $0<f4<f6$, and $0<f4<f8$, where f1 is a focal length of the first lens, f2 is a focal length of the second lens, f3 is a focal length of the third lens, f4 is a focal length of the fourth lens, f5 is a focal length of the fifth lens, f6 is a focal length of the sixth lens, f7 is a focal length of the seventh lens, and f8 is a focal length of the eighth lens.

In another general aspect, an optical imaging system includes a first lens, a second lens, a third lens, a stop, a fourth lens, a fifth lens, a sixth lens, a seventh lens, and an eighth lens sequentially disposed in numerical order beginning with the first lens from an object side of the optical imaging system toward an imaging plane of the optical imaging system.

The first to third lenses and the eighth lens each may include a convex object-side surface and a concave image-side surface.

The fourth lens may include a concave object-side surface and a convex image-side surface.

The fifth lens may include a concave object-side surface and a convex image-side surface; and the seventh lens may include a convex object-image side surface and a concave image-side surface.

The sixth lens may include a convex object-image side surface and a convex image-side surface.

The first lens and the second lens may have negative refractive power.

The third lens and the fourth lens may have positive refractive power.

The optical imaging system may further include a stop disposed between two of the lenses; an overall refractive power of ones of the lenses disposed between the object side of the optical imaging system and the stop may be negative; and an overall refractive power of ones of the lenses disposed between the stop and the imaging plane of the optical imaging system may be positive.

The optical imaging system may satisfy the Conditional Expressions $f2<f1<0$, $f1<f5<0$, $f7<f5<0$, $0<f4<f3$, $0<f4<f6$, $0<f4<f8$, where f1 is a focal length of the first lens, f2 is a focal length of the second lens, f3 is a focal length of the third lens, f4 is a focal length of the fourth lens, f5 is a focal length of the fifth lens, f6 is a focal length of the sixth lens, f7 is a focal length of the seventh lens, and f8 is a focal length of the eighth lens.

Other features and aspects will be apparent from the following detailed description, the drawings, and the claims.

BRIEF DESCRIPTION OF DRAWINGS

FIG. 2 is a table listing an example of characteristics of lenses of the optical imaging system illustrated in FIG. 1.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
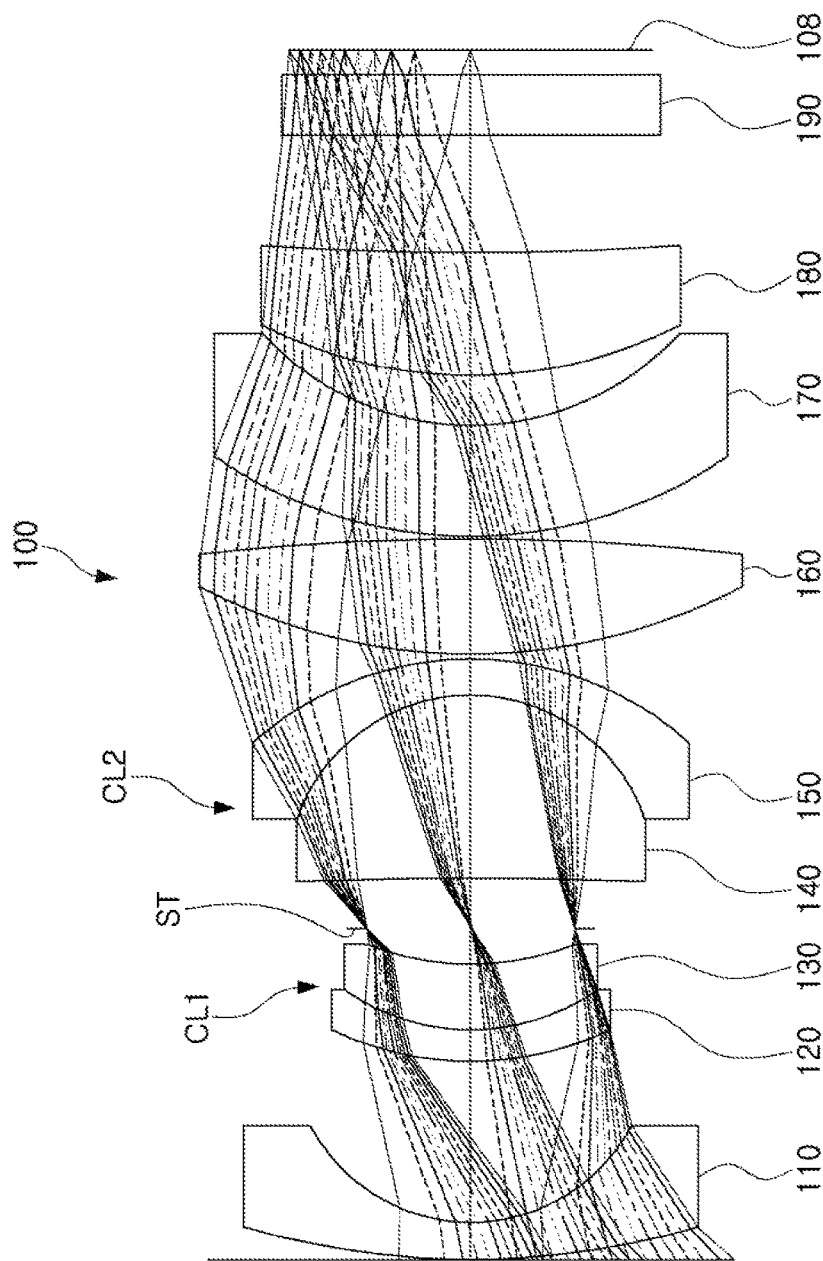
FIG. 1 is a view of an example of an optical imaging system.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

In this application, a first lens is a lens closest to an object or a subject, while an eighth lens is a lens closest to an imaging plane or an image sensor.

In this application, radii of curvature, thicknesses, total track lengths (TTLs), and focal lengths of lenses are expressed in millimeters (mm). Further, the thicknesses of the lenses, gaps between the lenses, and the TTLs are distances measured along the optical axes of the lenses.

Further, concerning shapes of the lenses, such shapes are described in relation to the optical axes of the lenses. A surface of a lens described as convex means that an optical axis portion of a corresponding surface is convex, and a surface of a lens described as concave means that an optical axis portion of a corresponding surface is concave. Therefore, in a configuration in which one surface of a lens is described as being convex, an edge portion of that surface of the lens may be concave. Likewise, in a configuration in which one surface of a lens is described as being concave, an edge portion of that surface of the lens may be convex.

An optical imaging system includes a plurality of lenses. For example, the optical imaging system may include eight lenses. Next, configurations of the lenses described above are described.

The first lens has refractive power. For example, the first lens may have negative refractive power.

One surface of the first lens is convex. For example, an object-side surface of the first lens may be convex.

The first lens has a spherical surface. For example, both surfaces of the first lens may be spherical. The first lens is formed of a material having high light transmissivity and excellent workability. For example, the first lens may be formed of glass. However, a material of the first lens is not limited thereto. For example, the first lens may be formed of plastic.

The first lens has a certain refractive index. For example, a refractive index of the first lens may be 1.70 or less. The first lens has an Abbe number lower than that of the second lens. For example, the Abbe number of the first lens may be 60 or less.

The second lens has refractive power. For example, the second lens may have negative refractive power.

One surface of the second lens is convex. For example, an object-side surface of the second lens may be convex.

The second lens includes a spherical surface. For example, both surfaces of the second lens may be spherical. The second lens is formed of a material having high light transmissivity and excellent workability. For example, the second lens may be formed of glass. However, a material of the second lens is not limited thereto. For example, the second lens may be formed of plastic.

The second lens has a certain refractive index. For example, a refractive index of the second lens may be 1.70 or more. The second lens may have an Abbe number higher than those of other lenses. For example, the Abbe number of the second lens may be 80 or more.

The third lens has refractive power. For example, the third lens may have positive refractive power.

One surface of the third lens is convex. For example, an object-side surface of the third lens may be convex.

The third lens includes a spherical surface. For example, both surfaces of the third lens may be spherical. The third lens is formed of a material having high light transmissivity and excellent workability. For example, the third lens may be formed of glass. However, a material of the third lens is not limited thereto. For example, the third lens may be formed of plastic.

The third lens has a certain refractive index. For example, a refractive index of the third lens may be 1.90 or more. The third lens has an Abbe number lower than those of other lenses. For example, the Abbe number of the third lens may be 25 or less.

The fourth lens has refractive power. For example, the fourth lens may have positive refractive power.

One surface of the fourth lens is concave. For example, an object-side surface of the fourth lens may be concave.

The fourth lens includes a spherical surface. For example, both surfaces of the fourth lens may be spherical. The fourth lens is formed of a material having high light transmissivity and excellent workability. For example, the fourth lens may be formed of glass. However, a material of the fourth lens is not limited thereto. For example, the fourth lens may be formed of plastic.

The fourth lens has a certain refractive index. For example, a refractive index of the first lens may be 1.80 or less. The fourth lens may have an Abbe number higher than those of lenses adjacent thereto, that is, the third lens and the fifth lens. For example, the Abbe number of the fourth lens may be 50 or more.

The fifth lens has refractive power. For example, the fifth lens may have negative refractive power.

One surface of the fifth lens is concave. For example, an object-side surface of the fifth lens may be concave.

The fifth lens includes a spherical surface. For example, both surfaces of the fifth lens may be spherical. The fifth lens may be formed of a material having high light transmissivity and excellent workability. For example, the fifth lens may be formed of glass. However, a material of the fifth lens is not limited thereto. For example, the fifth lens may be formed of plastic.

The fifth lens has a certain refractive index. For example, a refractive index of the fifth lens may be 1.90 or more. The fifth lens has an Abbe number lower than those of lenses adjacent thereto, that is, the fourth lens and the sixth lens. For example, the Abbe number of the fifth lens may be 20 or less.

The sixth lens has refractive power. For example, the sixth lens may have positive refractive power.

One surface of the sixth lens is convex. For example, an object-side surface of the sixth lens may be convex.

The sixth lens includes a spherical surface. For example, both surfaces of the sixth lens may be spherical. The sixth lens is formed of a material having high light transmissivity and excellent workability. For example, the sixth lens may be formed of glass. However, a material of the sixth lens is not limited thereto. For example, the sixth lens may be formed of plastic.

The sixth lens has a certain refractive index. For example, a refractive index of the sixth lens may be 1.80 or less. The sixth lens has an Abbe number higher than those of lenses adjacent thereto, that is, the fifth lens and the seventh lens. For example, the Abbe number of the sixth lens may be 50 or more.

The seventh lens has refractive power. For example, the seventh lens may have negative refractive power.

One surface of the seventh lens is convex. For example, an object-side surface of the seventh lens may be convex.

The seventh lens includes a spherical surface. For example, both surfaces of the seventh lens may be spherical. The seventh lens is formed of a material having high light transmissivity and excellent workability. For example, the seventh lens may be formed of glass. However, a material of the seventh lens is not limited thereto. For example, the seventh lens may be formed of plastic.

The seventh lens has a certain refractive index. For example, a refractive index of the seventh lens may be 1.90 or more. The seventh lens has an Abbe number lower than those of lenses adjacent thereto, that is, the sixth lens and the eighth lens. For example, the Abbe number of the seventh lens may be 30 or less.

The eighth lens has refractive power. For example, the eighth lens may have positive refractive power.

One surface of the eighth lens is convex. For example, an object-side surface of the eighth lens may be convex.

The eighth lens includes a spherical surface. For example, both surfaces of the eighth lens may be spherical. The eighth lens is formed of a material having high light transmissivity and excellent workability. For example, the eighth lens may be formed of glass. However, a material of the eighth lens is not limited thereto. For example, the eighth lens may be formed of plastic.

The eighth lens has a certain refractive index. For example, a refractive index of the eighth lens may be 1.80 or less. The eighth lens has an Abbe number higher than that of the seventh lens. For example, the Abbe number of the eighth lens may be 50 or more.

The optical imaging system includes an image sensor. The image sensor is configured to have a high resolution. For example, a unit size of pixels forming the image sensor may be 1.12 μm or less. A surface of the image sensor forms an imaging plane on which an image is formed.

The optical imaging system includes a stop. The stop is disposed between two of the lenses of the optical imaging system. For example, the stop may be disposed between the third and fourth lenses. The stop disposed in this location adjusts an amount of light incident to the image sensor.

The stop is disposed to bisect the refractive power of the optical imaging system. For example, the overall refractive power of the lenses of the optical imaging system positioned in front of the stop (that is, positioned adjacent to the object) may be negative, and the overall refractive power of the lenses of the optical imaging system positioned behind the stop (that is, positioned adjacent to the imaging plane) may be positive. This structure is advantageous in increasing a field of view of the optical imaging system and decreasing an overall length of the optical imaging system.

The optical imaging system includes a filter. The filter is disposed between the eighth lens and the image sensor to filter components decreasing resolution. For example, the filter may filter light having an infrared wavelength. The filter has a certain refractive index. For example, a refractive index of the filter may be 1.50 or more. The filter has an Abbe number higher than that of the eighth lens. For example, the Abbe number of the filter may be 60 or more.

The optical imaging system satisfies the following Conditional Expressions:

$$f2<f1<0$$

$$f1<f5<0$$

$$f7<f5<0$$

$$0<f4<f3$$

$$0<f4<f6$$

$$0<f4<f8$$

In the above Conditional Expressions, f1 is a focal length of the first lens, f2 is a focal length of the second lens, f3 is a focal length of the third lens, f4 is a focal length of the fourth lens, f5 is a focal length of the fifth lens, f6 is a focal length of the sixth lens, f7 is a focal length of the seventh lens, and f8 is a focal length of the eighth lens.

The above Conditional Expressions are relationships for appropriately distributing refractive power to the first to eighth lenses. For example, all of the first lens, the second lens, the fifth lens, and the seventh lens may be configured to have negative refractive power. Further, all of the third lens, the fourth lens, the sixth lens, and the eighth lens may be configured to have positive refractive power.

The fifth lens has the strongest refractive power among the lenses having negative refractive power. The fourth lens has the strongest refractive power among the lenses having positive refractive power.

The optical imaging system configured as described above has a high resolution. For example, the optical imaging system may have an F number of 1.6 or less. Thus, the optical imaging system may be employed in a small sensing camera. Further, the optical imaging system has a wide field of view. For example, the optical imaging system may have a horizontal field of view of 75° or higher. Thus, the optical imaging system may be employed in a monitoring camera which images a front visual field and a side visual field of a vehicle.

Next, an example of an optical imaging system is described.

FIG. 1 is a view of an example of an optical imaging system.

An optical imaging system 100 includes a plurality of lenses having refractive power. For example, the optical imaging system 100 includes a first lens 110, a second lens 120, a third lens 130, a fourth lens 140, a fifth lens 150, a sixth lens 160, a seventh lens 170, and an eighth lens 180. The first lens 110 to the eighth lens 180 are disposed in numerical order beginning with the first lens 110 from an object side of the optical imaging system 100 toward an imaging plane 108 of the optical imaging system.

In one example, the first lens 110 has negative refractive power, an object-side surface thereof is convex, and an image-side surface thereof is concave. The second lens 120 has negative refractive power, an object-side surface thereof is convex, and an image-side surface thereof is concave. The third lens 130 has positive refractive power, an object-side surface thereof is convex, and an image-side surface thereof is concave. The fourth lens 140 has positive refractive power, an object-side surface thereof is concave, and an image-side surface thereof is convex. The fifth lens 150 has negative refractive power, an object-side surface thereof is concave, and an image-side surface thereof is convex. The sixth lens 160 has positive refractive power, and an object-side surface and an image-side surface thereof are convex. The seventh lens 170 has negative refractive power, an object-side surface thereof is convex, and an image-side surface thereof is concave. The eighth lens 180 has positive refractive power, an object-side surface thereof is convex, and an image-side surface thereof is concave.

In the configuration as described above, the sixth lens 160 and the seventh lens 170 are configured to reduce astigmatic aberration and distortion aberration. In one example, the sixth lens 160 and the seventh lens 170 have a convex object-side surface formed thereon to reduce aberrations caused by the first to fifth lenses 110 to 150. In another example, the sixth lens 160 and the seventh lens 170 are configured to have substantially weak refractive power to reduce aberrations caused by the first to fifth lenses 110 to 150.

The optical imaging system 100 includes a stop ST. The stop ST is disposed between the third lens 130 and the fourth lens 140. The stop ST disposed in this location may increase a resolution of the optical imaging system 100 by blocking ambient light that causes lateral aberration (coma), astigmatism, rectilinear distortion, or lateral chromatic aberration.

The optical imaging system 100 includes a filter 190. The filter 190 is disposed between the eighth lens 180 and the imaging plane 108. The filter 190 may block infrared light, and may prevent foreign substances from being introduced from the imaging plane 108.

The optical imaging system 100 includes an image sensor. The image sensor includes the imaging plane 108 on which light refracted by the first to eighth lenses 110 to 180 is focused.

The optical imaging system 100 includes a plurality of cemented lenses. For example, the optical imaging system 100 includes a pair of a first cemented lens CL1 formed by cementing the second lens 120 to the third lens 130, and a second cemented lens CL2 formed by cementing the fourth lens 140 to the fifth lens 150.

The first and second cemented lenses CL1 and CL2 are symmetrical to each other around the stop ST. For example, all of the first and second cemented lenses CL1 and CL2 may have positive refractive power. Further, the first cemented lens CL1 is convex toward the object, and the second cemented lens CL2 is convex toward the imaging plane.

The pair of first and second cemented lenses CL1 and CL2 configured as described above may compensate for Seidel aberration, rectilinear distortion, coma, or lateral chromatic aberration preventing formation of a clear image.

The second cemented lens CL2 is symmetrical to the seventh lens 170 and the eighth lens 180. In one example, the fourth lens 140 of the second cemented lens CL2 is symmetrical to the eighth lens 180, and the fifth lens 150 of the second cemented lens CL2 is symmetrical to the seventh lens 170. In another example, the fourth lens 140 of the second cemented lens CL2 has the same refractive power as the eighth lens 180, and the fifth lens 150 of the second cemented lens CL2 has the same refractive power as the seventh lens 170.

FIG. 2 is a table listing an example of characteristics of the lenses of the optical imaging system 100 illustrated in FIG. 1.

All of the first to eighth lenses 110 to 180 are formed of glass. The optical imaging system 100 configured as described above may realize a sharp, clear image.

The third lens 130, the fifth lens 150, and the seventh lens 170 are formed of a high refractive material. For example, all of the third lens 130, the fifth lens 150, and the seventh lens 170 have a refractive index of 1.90 or more.

The third lens 130, the fifth lens 150, and the seventh lens 170 are configured to reduce chromatic aberration caused by lenses adjacent thereto. For example, all of the third lens 130, the fifth lens 150, and the seventh lens 170 have an Abbe number lower than those of lenses adjacent thereto.

The second lens 120 is cemented to the third lens 130. For example, an image-side surface S4 of the second lens 120 is entirely adhered to an object-side surface S5 of the third lens 130. To this end, a radius of curvature of the image-side surface S4 of the second lens 120 and a radius of curvature of the object-side surface S5 of the third lens 130 are the same as each other.

The fourth lens 140 is cemented to the fifth lens 150. For example, an image-side surface S9 of the fourth lens 140 is entirely adhered to an object-side surface S10 of the fifth lens 150. To this end, a radius of curvature of the image-side surface S9 of the fourth lens 140 and a radius of curvature of the object-side surface S10 of the fifth lens 150 are the same as each other.

All of the first lens 110, the second lens 120, the fifth lens 150, and the seventh lens 170 have a negative focal length. For example, all of the first lens 110, the second lens 120, the fifth lens 150, and the seventh lens 170 have negative refractive power. The fifth lens 150 has the maximum refractive power among the first lens 110, the second lens 120, the fifth lens 150, and the seventh lens 170 having negative refractive power.

All of the third lens 130, the fourth lens 140, the sixth lens 160, and the eighth lens 180 have a positive focal length. For example, all of the third lens 130, the fourth lens 140, the sixth lens 160, and the eighth lens 180 have positive refractive power. The fourth lens 140 has the maximum refractive power among the third lens 130, the fourth lens 140, the sixth lens 160, and the eighth lens 180 having positive refractive power.

Figure 3:
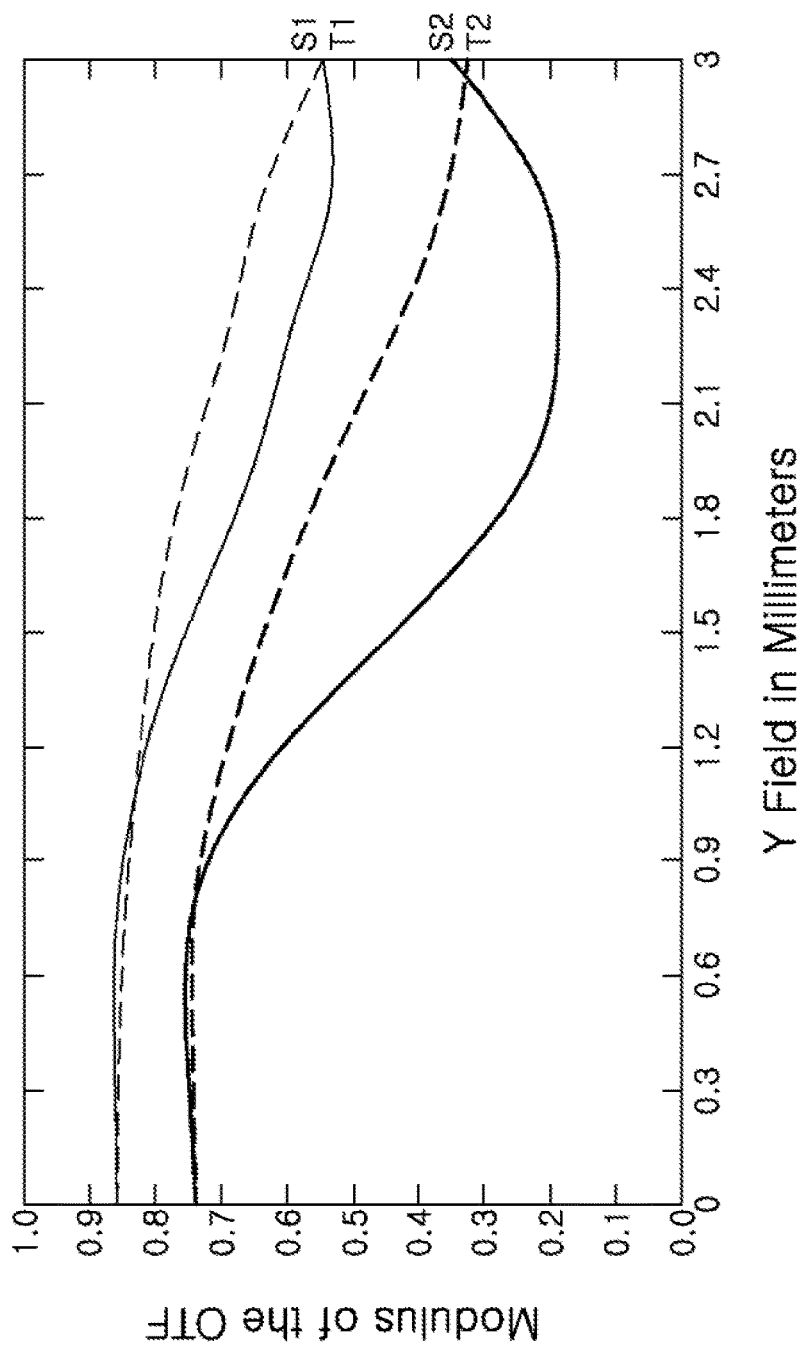
FIG. 3 is a graph illustrating an example of modulation transfer function (MTF) characteristics of the optical imaging system illustrated in FIG. 1.

FIG. 3 is a graph illustrating an example of modulation transfer function (MTF) characteristics of the optical imaging system 100 illustrated in FIG. 1.

According to the examples of an optical imaging system described above, a high level of resolution may be realized even in a high temperature environment.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens having refractive power;
a second lens having refractive power;
a third lens having refractive power and cemented to the second lens;
a fourth lens having refractive power and a concave object-side surface;
a fifth lens having refractive power and cemented to the fourth lens;
a sixth lens having refractive power;
a seventh lens having refractive power and a convex object-side surface; and
an eighth lens having refractive power;
wherein the first to eighth lenses are sequentially disposed in numerical order beginning with the first lens from an object side of the optical imaging system toward an imaging plane of the optical imaging system.

2. The optical imaging system of claim 1, wherein the first lens has negative refractive power.

3. The optical imaging system of claim 1, wherein the second lens has negative refractive power.

4. The optical imaging system of claim 1, wherein the third lens has positive refractive power.

5. The optical imaging system of claim 1, wherein the fourth lens has positive refractive power.

6. The optical imaging system of claim 1, wherein the fifth lens has negative refractive power.

7. The optical imaging system of claim 1, wherein the sixth lens has positive refractive power.

8. The optical imaging system of claim 1, wherein the seventh lens has negative refractive power.

9. The optical imaging system of claim 1, wherein the eighth lens has positive refractive power.

10. The optical imaging system of claim 1, further comprising a stop disposed between two of the lenses;
wherein an overall refractive power of ones of the lenses disposed between the object side of the optical imaging system and the stop is negative; and
an overall refractive power of ones of the lenses disposed between the stop and the imaging plane of the optical imaging system is positive.

11. The optical imaging system of claim 1, wherein the optical imaging system satisfies the following Conditional Expressions:

$$f2<f1<0$$

$$f1<f5<0$$

$$f7<f5<0$$

$$0<f4<f3$$

$$0<f4<f6$$

$$0<f4<f8$$

where $f1$ is a focal length of the first lens, $f2$ is a focal length of the second lens, $f3$ is a focal length of the third lens, $f4$ is a focal length of the fourth lens, $f5$ is a focal length of the fifth lens, $f6$ is a focal length of the sixth lens, $f7$ is a focal length of the seventh lens, and $f8$ is a focal length of the eighth lens.

12. An optical imaging system comprising a first lens, a second lens, a third lens, a stop, a fourth lens, a fifth lens, a sixth lens, a seventh lens, and an eighth lens sequentially disposed in numerical order beginning with the first lens from an object side of the optical imaging system toward an imaging plane of the optical imaging system,
wherein the fourth lens has a concave object-side surface and the seventh lens has a convex object-side surface.

13. The optical imaging system of claim 12, wherein the first to third lenses and the eighth lens each comprise a convex object-side surface and a concave image-side surface.

14. The optical imaging system of claim 12, wherein the fourth lens comprises a convex image-side surface.

15. The optical imaging system of claim 12, wherein the fifth lens comprises a concave object-side surface and a convex image-side surface; and
the seventh lens comprises a concave image-side surface.

16. The optical imaging system of claim 12, wherein the sixth lens comprises a convex object-image side surface and a convex image-side surface.

17. The optical imaging system of claim 12, wherein the first lens and the second lens have negative refractive power.

18. The optical imaging system of claim 12, wherein the third lens and the fourth lens have positive refractive power.

19. The optical imaging system of claim 12, further comprising a stop disposed between two of the lenses;
wherein an overall refractive power of ones of the lenses disposed between the object side of the optical imaging system and the stop is negative; and
an overall refractive power of ones of the lenses disposed between the stop and the imaging plane of the optical imaging system is positive.

20. The optical imaging system of claim 12, wherein the optical imaging system satisfies the following Conditional Expressions:

$$f2<f1<0$$

$$f1<f5<0$$

$$f7<f5<0$$

$$0<f4<f3$$

$$0<f4<f6$$

$$0<f4<f8$$

where $f1$ is a focal length of the first lens, $f2$ is a focal length of the second lens, $f3$ is a focal length of the third lens, $f4$ is a focal length of the fourth lens, $f5$ is a focal length of the fifth lens, $f6$ is a focal length of the sixth lens, $f7$ is a focal length of the seventh lens, and $f8$ is a focal length of the eighth lens.

* * * * *